Patented Sept. 19, 1922.

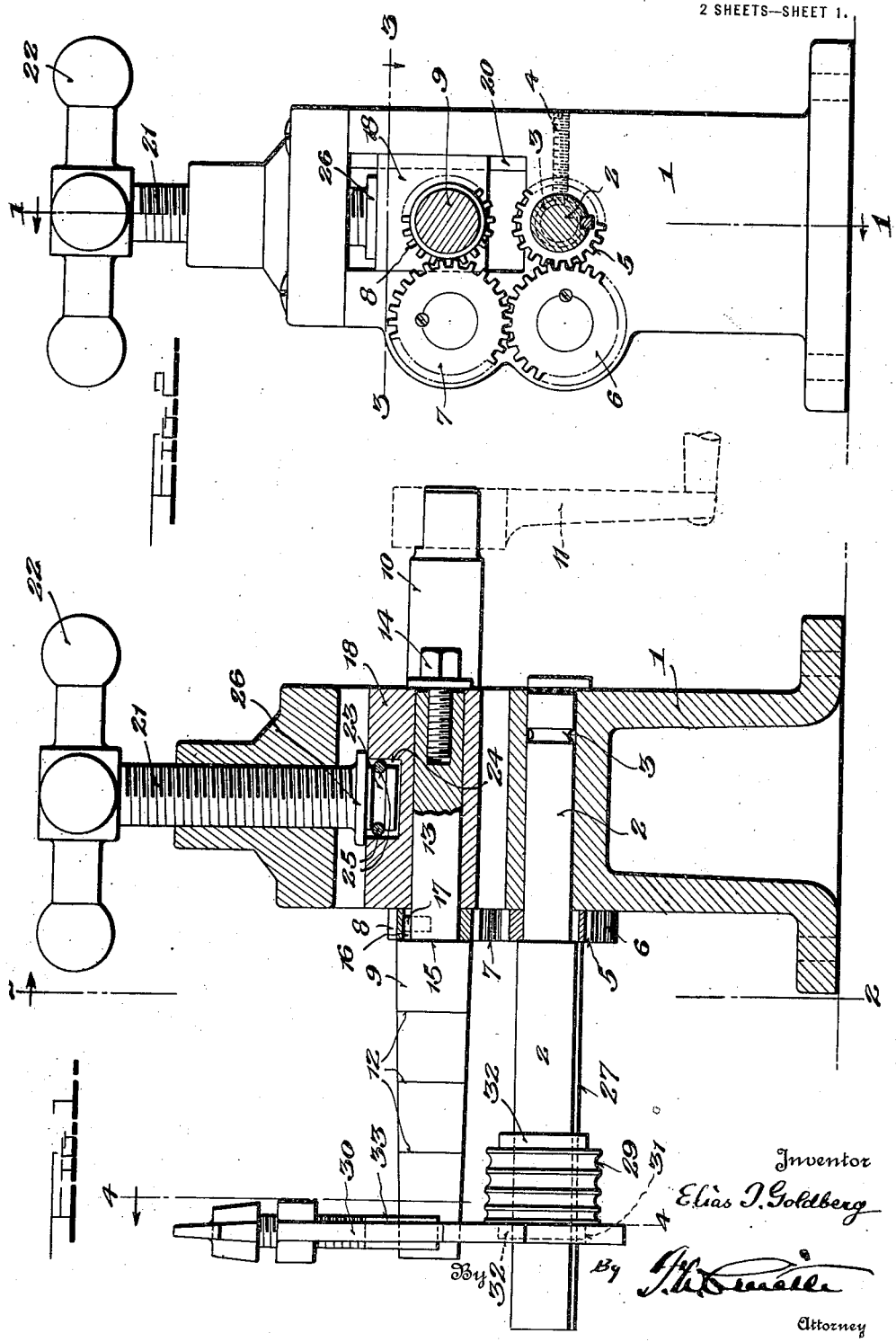

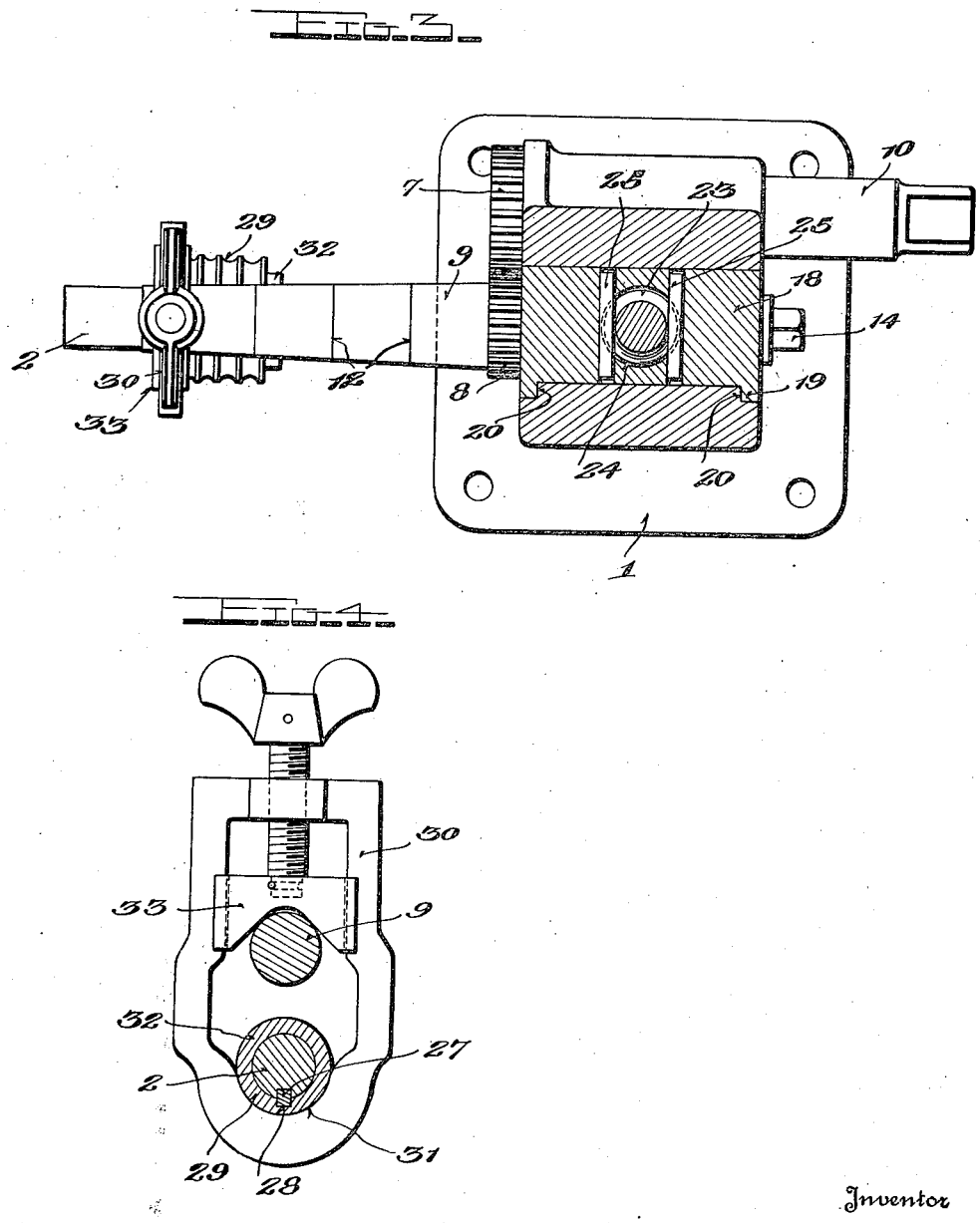

1,429,502

UNITED STATES PATENT OFFICE.

ELIAS T. GOLDBERG, OF NEW YORK, N. Y., ASSIGNOR TO ROSE GOLDBERG, OF NEW YORK, N. Y.

MACHINE FOR ENLARGING RINGS.

Application filed March 26, 1921. Serial No. 455,935.

*To all whom it may concern:*

Be it known that I, ELIAS T. GOLDBERG, a citizen of the United States, residing at the city of New York, county of New York, and State of New York, have invented certain new and useful Improvements in Machines for Enlarging Rings; and I do declare the following to be a full, clear, and exact description of the invention, such as will enable others skilled in the art to which it appertains to make and use the same.

This invention relates to certain new and useful improvements in machines for enlarging rings and pertains more especially to machines of this type for jeweler's use.

The invention has for its primary object to simplify the construction and reduce the cost of production of machines of this type, especially as compared with Patent No. 1187139 dated June 13, 1916, upon which latter the present invention is an improvement.

Further, the invention aims to provide a machine of this type which will operate with smaller sized rings equally as well as with larger sized ones and in this regard provides means entirely foreign to the patent noted.

In the drawings:

Figure 1, is a side elevation, partly in vertical section of the invention on line 1—1 of Figure 2;

Figure 2, is a section on line 2—2 of Figure 1;

Figure 3 is a section on line 3—3 of Figure 2, and

Figure 4 is a section on line 4—4 of Figure 1.

In proceeding in accordance with the present invention, a frame 1 is employed having a shaft 2 journaled therein, the latter formed with a groove 3 receiving the inner end of a screw 4 which is threaded into the frame, to thus allow free rotation of the shaft but to prevent longitudinal movement thereof.

A pinion 5 is mounted on shaft 2 and meshes with a pinion 6 that is carried by the frame, the pinion 6 in turn meshing with a pinion 7. The pinion 7 is in mesh with a pinion 8 mounted on what is commonly termed the jeweler's stick 9. The pinion 7 is carried by a driving shaft 10 which may be operated by a suitable crank 11, for example.

The stick 9 has graduations 12 thereon to indicate different diameters of rings and is removable from the frame to permit of the substitution of different sticks which are tapered according to the various sizes of the rings. Each stick has a spindle 13, the spindles of all of the sticks being alike and held in place by a bolt 14 the head of which abuts the end of the spindle so as to prevent friction of the bolt against the frame during rotation of the spindle.

Further, the gear 8 is used with each stick, and accordingly each of the latter is shouldered at 15 to engage the gear, the latter having a lateral groove 16 to receive a pin or key 17 on the spindle of each stick. In this manner the gear 8 can be slid off of the stick and placed on a different stick and the latter then secured in place by the bolt 14.

A brass block 18 is vertically movable in the frame and has guides 19, shown in Figures 2 and 3, which engage guides 20 formed in the frame. A main screw 21 has a handle 22 thereon and has its lower end formed with a circular groove 23, and extending into a recess 24 formed in the upper face of the block. Pins 25 are driven through the block and extend into the groove 23, whereby the screw can freely rotate and will raise or lower the block according to its direction of rotation.

A shoulder or flange 26 is formed on the screw and engages the upper face of the block, this shoulder or flange sustaining all of the upward thrust of the block during the machine operation.

The shaft 2 has a longitudinal key 27 which extends into a key-way 28 (Figure 4) formed in a circular block 29. The block 29 has a series of circular concave grooves of varying widths to conform to the external contours of rings of different widths.

In enlarging rings that are quite small and which fit over the stick near the extreme end thereof, the pressure between the ring on the stick and the circular block is apt to spring the stick 9 and shaft 2 on which the block is mounted, slightly apart which is somewhat of a defect in the prior construction. In order to obviate this a clamping dog 30 shown at Figures 1 and 4 of the drawings is placed in position and the clamping screw operated so that the rounded bottom 31 of this dog will closely embrace a collar 32 while the jaw 33 is operated by the screw to contact the stick, as clearly shown at Figure 4 and this will effectually prevent the springing apart defect noted.

It will be seen that there are two of these collars 32, the object of which is as follows: Suppose a small ring is placed on the stick which would be near the outer end of the stick since that is where the small diameter is, and that this ring had set therein a stone which projected laterally. If the dog were secured in position around the outer collar then this stone would hit the dog during the operation necessary to enlarge the ring, and if the ring were big enough when placed on the stick to be opposite the next groove the stone might even be big enough to hit the dog. Therefore the dog is then placed around the inner collar so that it will not interfere with the stone. If a larger ring is being treated and would hit against the dog if it was around the inner collar then the dog is transferred to the outer collar. Whenever the stone in the rings is on the point of coming in contact with the part 29, the machine is stopped and the ring shifted around, and at the same time pushed as far along the stick as a slight enlargement of the ring will permit, and this operation is repeated when the ring is again on the point of hitting such part 29.

Should the exterior contour of a ring be other than rounding, these grooves would, of course, be shaped accordingly so as to conform to the outer surface of the ring, and also as many of these blocks 29 may be employed as is found necessary according to the varieties in the outer contours of the rings.

The operation is as follows:

The ring to be enlarged is placed upon the stick 9 and a circular block 29 having the proper circumferential groove to conform to the outer surface of the ring is placed on the shaft 2 with its key-way fitting on the key 27, and such block is moved along until the groove is beneath the ring, whereupon the handle 22 is operated to clamp the ring within the groove.

It will, of course, be understood that the ring is wedged on the tapered stick as far as possible by hand, and the size to which the ring is to be enlarged is denoted by the graduated scale 12.

The crank 11 is now turned, thereby revolving the block, the stick and the ring, the stick and the ring being revolved in a direction opposite to that in which the block is revolved. The handle 22 is from time to time operated as the ring is stretched or enlarged so as to keep such ring firmly clamped against the block whereby the latter, during the enlargement of the ring, will serve to perfectly shape the enlarged ring to the stick thus preventing any inaccuracies in the circlet.

As the parts are revolving in the manner above described, the ring itself will be dragged or forced around the stick, and owing to the tapered nature of the latter a wedging action is constantly exerted against the inner surface of the ring which assists in the stretching thereof; but the action of the circular block on the different contours as they are presented exerts a continuous pulling action on the ring which results in the stretching or enlargement of the latter.

The above operation is preferably intermittently carried on by stopping the revolution of the crank and turning the handle to separate the ring and circular block, so that the latter may be still further wedged along the stick by the hand, whereupon the parts are restored to operative position and the crank is again turned, and this operation is continued until the ring is sufficiently enlarged so that it will readily slide along the stick up to the proper size desired.

What is claimed is:

1. In a ring enlarging machine, a tapered ring receiving member, a shaft parallel thereto, a circular block on the shaft for movement therewith, means to vary the space between the member and shaft, means to rotate the member and shaft in unison, and means to engage the outer ends of the shaft and member to prevent same from springing apart during the rotation thereof.

2. In a ring enlarging machine, a tapered ring-receiving member, a shaft parallel thereto, a circular block on the shaft for movement therewith, means to vary the space between the member and shaft, means to rotate the member and shaft in unison, and a clamping dog having an adjustable jaw engaged with and receiving the outer ends of the shaft and member to prevent same from springing apart.

3. In a ring enlarging machine, a frame, a block vertically movable therein, a screw threaded through the frame, means to rotatably connect the lower end of the screw to the center of the block to cause the latter to move vertically with the screw, a stick borne by the block, a gear removably keyed to the stick, means to secure the stick to the block, a shaft on the frame having a circular block to act on the ring, and gears to rotate the stick and shaft in unison.

4. In a ring enlarging machine, a frame, an apertured block slidable therein, a shouldered stick having a spindle, a key on the spindle, a pinion slidable on the spindle and having a groove to receive the key and being arranged between the shoulder and the block, means on the opposite end of the spindle to limit longitudinal movement thereof, a shaft, a circular block thereon, and means to drive the gear and the shaft in unison.

5. In a ring enlarging machine, a stick, a shaft, a circular block on the shaft having a collar on each end thereof, a clamp engaged over the stick and with one of the collars, and means to rotate the stick and shaft in unison.

6. In a ring enlarging machine, a stick, a shaft, a circular block on the shaft having a collar on one end thereof, a clamp engaged over the stick and with said collar, and means to rotate the stick and shaft in unison.

7. In a ring enlarging machine, a frame, a block slidable therein, a stick borne by the block, removable driving means for the stick borne thereby, means to raise and lower the block, a shaft, a circular block thereon, and means to drive the shaft and the driving means of the stick in unison.

8. In a ring enlarging machine, a frame a block vertically movable therein, a stick borne by the block, a screw threaded through the frame and having a grooved lower end, means borne by the block to engage in the screw groove to allow the screw to rotate but to raise or lower the block as the screw is raised or lowered, a shaft, a circular block on the shaft, and means to drive the shaft and stick in unison.

In testimony whereof I affix my signature hereto.

ELIAS T. GOLDBERG.